US006856687B2

(12) United States Patent
DiSanto et al.

(10) Patent No.: US 6,856,687 B2
(45) Date of Patent: Feb. 15, 2005

(54) PORTABLE TELECOMMUNICATION SECURITY DEVICE

(75) Inventors: Frank J. DiSanto, Manhasset, NY (US); Denis A. Krusos, Lloyd Harbor, NY (US)

(73) Assignee: Copytele, Inc., Melville, NY (US)

( * ) Notice: Subject to any disclaimer, the term of this patent is extended or adjusted under 35 U.S.C. 154(b) by 420 days.

(21) Appl. No.: 10/162,800

(22) Filed: Jun. 5, 2002

(65) Prior Publication Data

US 2003/0009659 A1 Jan. 9, 2003

Related U.S. Application Data

(63) Continuation-in-part of application No. 10/096,811, filed on Mar. 13, 2002, and a continuation-in-part of application No. 09/336,948, filed on Jun. 21, 1999, now Pat. No. 6,430,691.

(51) Int. Cl.[7] .......... H04N 7/167

(52) U.S. Cl. .......... 380/243; 380/266; 380/269; 380/366

(58) Field of Search .......... 380/243, 266, 380/269, 366

(56) References Cited

U.S. PATENT DOCUMENTS 5,253,293 A * 10/1993 Shigemitsu et al. ........ 380/266
5,410,599 A * 4/1995 Crowley et al. ............ 380/269
5,455,861 A * 10/1995 Faucher et al. ............. 380/266

* cited by examiner

*Primary Examiner*—Thomas R. Peeso
(74) *Attorney, Agent, or Firm*—Plevy, Howard & Darcy, PC

(57) ABSTRACT

A portable security device for providing secure communications over a plurality of networks is presented. In one embodiment, the device comprises, at least one communication port for transfer of audio data, at least one communication port for transfer of digital data, a keypad, an encoding/decoding device, a conversion device operable to covert between audio and digital data and a processor, in communication with a memory, the keypad, the said encoding/decoding device, operable to execute code for selecting a configuration of a transmission and a reception port from among said communication ports dependent upon the presence of a network communication device and an input/output device in communication with said selected ports, providing data received from said selected reception port to said encryption/decryption device for encrypting; and providing said encrypted data to said selected transmission port. In one aspect of the invention, encrypted voice data can be transferred over a wireless network using cellular phones, over a wired and wireless network using land-based telephones, cellular phones or satellite phones. In another aspect, encrypted computer data may be transferred over wired or wireless networks.

29 Claims, 8 Drawing Sheets

PORTABLE TELECOMMUNICATION SECURITY DEVICE

RELATED APPLICATION

This application is a continuation-in-part of commonly assigned:

U.S. patent application Ser. No. 09/336,948, entitled "Stand-Alone Telecommunications Security Device" filed Jun. 21, 1999; now U.S. Pat. No. 6,430,691 and U.S. patent application Ser. No. 10/096,811 entitled "Method and Apparatus for Securing E-Mail Attachments" filed Mar. 13, 2002, which are incorporated by reference herein.

FIELD OF THE INVENTION

The present invention relates to telecommunications security devices, and more particularly to a security device adapted for use with voice and data transmissions.

BACKGROUND OF THE INVENTION

The demand for increased security of telecommunications systems continues to grow as increased levels of confidential information is passed along wired and wireless networks. As more users increasingly are outside their normal place of business, for example, on travel or telecommuting, the demand for devices that render unintelligible unauthorized interception of voice, data, facsimile and other electronically transmitted information also increases. If, for example, a telecommuting user contacts a second user using a conventional telephone system and expects to discuss sensitive information, the telecommuting user may wish to encrypt the conversation or any data transmitted to frustrate unauthorized interception of their conversation. As many users possess wire-based telephones, facsimile machines, computers, and wireless communication devices, such as cellular telephones, it is desirable to provide a portable security device capable of performing encryption/decryption functions in connection with these existing devices and other types of communication equipment.

However, the ability of a single device to handle existing and intended communication equipment many telephone systems have significant limitations on the transmission bandwidth. In digital terms this relates to a limitation of speed or baud rate that digital data may be transmitted. Hence, digital transmission over limited bandwidth telephone lines of conventional high-speed digital voice data creates a noticeable alteration in the received and reconstructed voice data. Furthermore, encryption processing creates a still more noticeable alteration in the received and reconstructed voice data as the encryption process adds a significant number of encoding bits that do not contribute to the audio information.

Accordingly, there is a need for a portable device for encryption/decryption information from one or more communication sources that provides increased security of the transmitted message while allowing for transmission of acceptable voice data over networks of different available bandwidths.

BRIEF DESCRIPTION OF THE FIGURES

FIGS. 1 through 6 and the accompanying detailed description contained herein are to be used as an illustrative embodiment of the present invention and should not be construed as the only manner of practicing the invention. It is to be understood that these drawings are for purposes of illustrating the concepts of the invention and are not to scale. It will be appreciated that the same reference numerals, possibly supplemented with reference characters where appropriate, have been used throughout to identify corresponding parts.

DETAILED DESCRIPTION OF THE INVENTION

Figure 1:
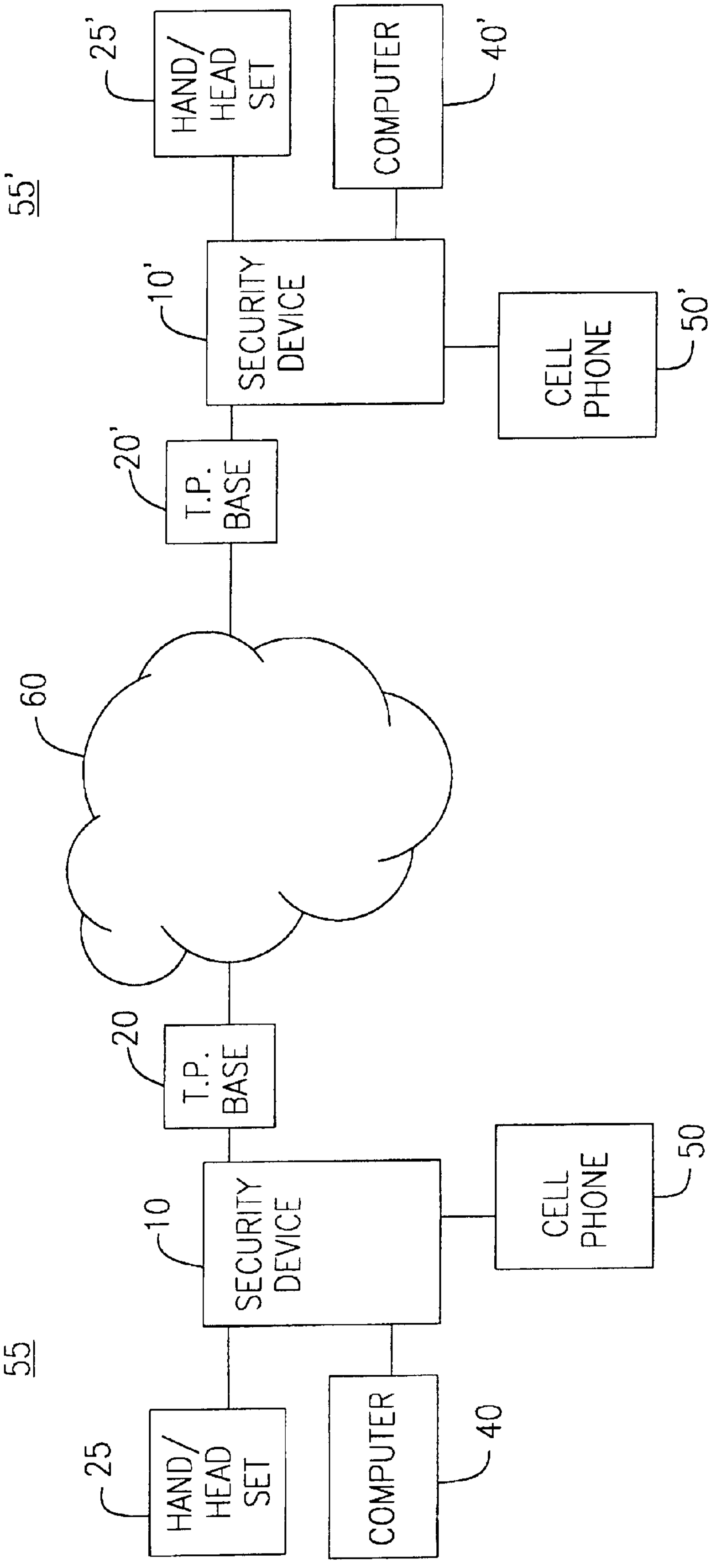
FIG. 1 illustrates an overview of a communications system according to one aspect of the present invention.

FIG. 1 illustrates a telecommunications system configuration which includes security devices 10, 10' according to one aspect of the present invention. For sake of explanation, the following discussion will utilize a prime (') description for those elements and steps relating to a second like device. Therein, a first user at a first location 55 has access to a first security device 10 and one or more communication devices such as telephone base 20, telephone handset or headset 25, computer 40 and wireless communication device 50. As will be appreciated, wireless communication device 50 may be any device such as a cellular telephone, Personal Directory Assistant (PDA), Pocket PC, etc, that includes wireless transmission capability. In a preferred embodiment, wireless communication device 50 is a cellular telephone containing a serial port. In an alternative aspect, wireless communication device 50 may communicate with security device 10 using an infrared port.

A second user at a location 55' has access to a second similar security device 10', and one or more comparable communication devices, such as telephone base 20', head set or hand set 25', computer 40' and/or cellular telephone 50'.

As will be appreciated, one or more of a first user's devices (10, 20, 25, 40, 50) can be concurrently interconnected to one or more of a second user's devices (10', 20', 25', 40', 50') using any conventional communications system 60 such as a conventional public switched telephone network ("PSTN"), wireless communication system, LAN, WAN, INTERNET, or INTRANET. Furthermore, although, a plurality of devices are shown connected to or in communication with a corresponding security device, it will be appreciated that all the illustrated devices need not be concurrently connected or present for proper operation of security devices 10, 10'.

Figure 2A:
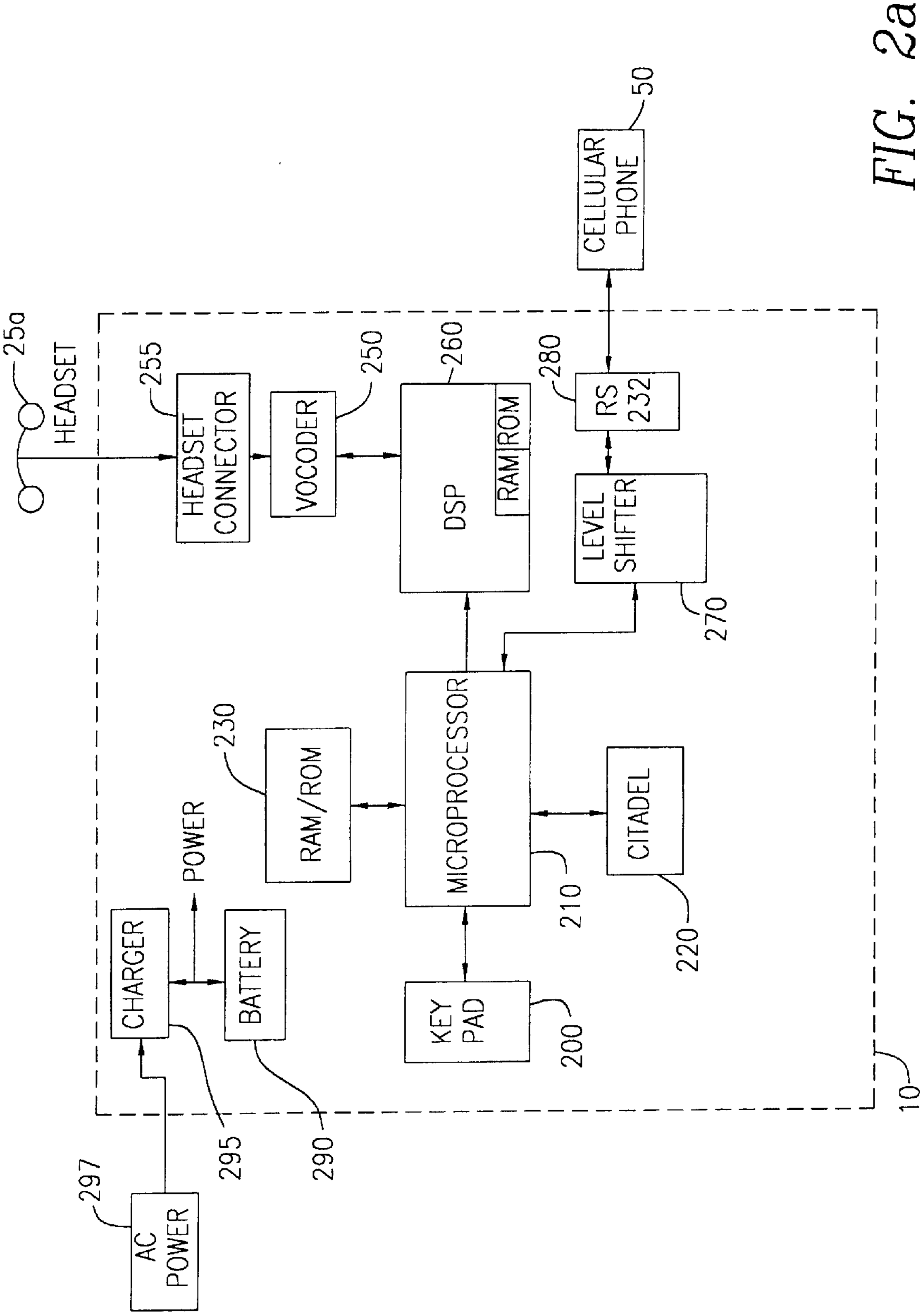
FIG. 2*a* illustrates a block diagram of a telecommunications security device according to a first embodiment of the present invention.

FIG. 2*a* illustrates a block diagram of a first embodiment of security device 10 for providing secure communication of voice data in accordance with the principles of the present invention. In this first embodiment, device 10 contains only keypad 200, port 255 for receiving/transmitting audio data and a first data port 280 for receiving/transmitting encrypted audio, i.e., voice data over network 60. Although port 255 and data port 280 are representative of conventional input/output ports, for clarity, the operation of security is presented with regard to its transmission operation. Hence, it would be understood that port 255 would be a reception port for receiving audio information and port 280 would be a transmission port for transmission of information over network 60. It will be further understood that when device 10 is operating as a receiving system, port 280 would in fact be a reception port. However, for clarity, even in a receiving mode, the selected ports will retain their port designations as if operating in a transmitting mode.

In this first embodiment, keypad 200 provides a means of inputting a series or set of alphanumeric characteristics representative of a destination address. For example, if a destination is a conventional land-based or wireless telephone; then keypad 200 may be used to enter or input a series of characters that are associated with the telephone number of the desired destination telephone.

After a communication link is established with the destination telephone, plain text voice data may spoken into illustrated headset 25*a,* which is provided to or received by device 10 through port connector 255. In this illustrated embodiment, port connector 255 is a standard mini-RCA 2.5 mm stereo jack connector, which is well known in the art. In a preferred embodiment, connector 255 is a standard RJ-8 connector. In an alternative aspect, port 255 may be selected to complement the connection means of a headset. For example, port 255 may be a RJ-8 port when head set 25 uses such a connector. In another preferred aspect of the invention (not shown), security device 10 includes both an RJ-8 type port and an mini-RCA 2.5 mm stereo jack port connector to allow for operation of device 10 with either a headset 25 or a telephone handset (not shown). To provide clarity in the description of device 10, port 255 is hereinafter referred to as connector port 255*a* when the connector type is a conventional mini-RCA 2.5 mm stereo jack connector and as port 255*b* when the connector type is a conventional RJ-8 connector.

Analog voice data provided by, in this case, headset 25 is next digitized using vocoder 250. Vocoder 250 creates packets of low rate digitized voice data that is provided to digital signal processor (DSP) 260. Vocorder 250 is representative of special purpose hardware using specially designed voice compression algorithms that convert analog voice data to a representative digital format. However, rather than using a conventional digital sampling algorithm that digitizes voice and music data at a rate of 64 Kilobits per second, vocorder 250 digitizes voice input using special developed software algorithms. The digitalization of voice using vocorder 250 provides a low bit rate digital voice data suitable for most telephone networks at an acceptable audio quality level. Low bit rate digital voice data is advantageous as it allows for the transmission of voice data over telephone networks that have limited available bandwidth or large bit-error rates, i.e., are noisy. In a one aspect, vocoder 250 is selectable to provide digital voice data in the range of 2 Kb to 33.6 Kb per second and preferably uses an AMBI algorithm, developed by Digital Voice Systems, Inc., for voice digitalization. In a preferred embodiment, the digitalization of vocoder 250 is selected to match a desired output bit rate, e.g., 4800 bits per second.

DSP 260 controls the transfer of digitized voice data between vocoder 250 and microprocessor 210. DSP 260, in one mode, receives the digital voice data, in packets, and transfers the packets to microprocessor 210. DSP 260 may further buffer received voice packets to provide a continuous stream of data rather than bursts of data packets to processor 210. As will be understood in the art, DSP 260 can also operate in a second mode to receive data from microprocessor 210 and transfer this data to vocoder 250 for transmission to headset connector 255, for example. In one aspect of the invention, DSP 260 takes the form similar to the Texas Instruments TMS320C542PGE2-40. DSPs are well known in the art and need not be discussed herein.

Microcontroller 210 is further coupled to encryption/decryption device 220, RAM/ROM 230, and in this illustrative case, level shifter 270. In one aspect, microcontroller or microprocessor 210 takes the form of microprocessors similar to the Intel N80C251SB16. It will be understood in the art that the functions performed by microprocessor 210 and DSP 260 may be performed by a single microprocessor, computer or DSP and the illustration of both of a microcontroller and DSP is made only for the purposes of illustrating the operation of the invention. Microcontroller 210 may also perform operations that multiplex data from separate sources, when desired.

RAM/ROM 230 is representative of a memory unit accessible by microcontroller 210 that contains program code that directs the control of microprocessor 210 to pass data to and from the illustrated elements, as is understood by those skilled in the art.

Encryption/decryption device 220 serves to encrypt and decrypt data consistent with known encryption/decryption codes, which are well known. In a preferred embodiment, encryption/decryption device 220 is a representative of a hardware-encoding chip, similar to a Harris Corporation CITADEL DDX device. However, any suitable means for encrypting and decrypting data as is well known in the art can be used. For example, microcontroller 210 may also perform the encryption/decryption operation using known software algorithms.

Level shifter 270 is representative of a voltage shifter that shifts the voltage levels of signals detected on digit port 280 when digital port 280 includes voltages levels that are not compatible with microprocessor 210. For example, level shifter 270 may be used when port 280 is an RS-232 port that is known to have both positive and negative voltage level, i.e., +/−5 volts. In the illustrated configuration, level shifter 270 shifts the voltage levels to values in the range 0 to 5 volts, which is a range suitable for application to microcontroller 210.

Data port 280 preferably takes the form of an RS-232 serial I/O port which permits communications between communication devices, such as cellular telephone 50, personal data assistant or other proprietary device, and security device 10. However, it would be appreciated that other suitable interfaces may be utilized as data port 280, e.g., an infrared port. It will also be appreciated that when port 280 is representative of a port having voltage levels compatible with microcontroller 210, then level shifter 270 is not necessary and microcontroller 210 may be in direct communication with port 280.

Battery 290 and charger 295 are well known means for providing power to security device 10 and need not be discussed in detail. Operation of security device 10 using battery 290 will be understood to allow security device 10 to be operated as a portable device. It will also be appreciated that charger 295 may provide power concurrently to security device 10 and battery 290. In this manner, security device 10 may be operated to receive or transmit encoded messages and concurrently recharge battery 290.

Figure 2B:
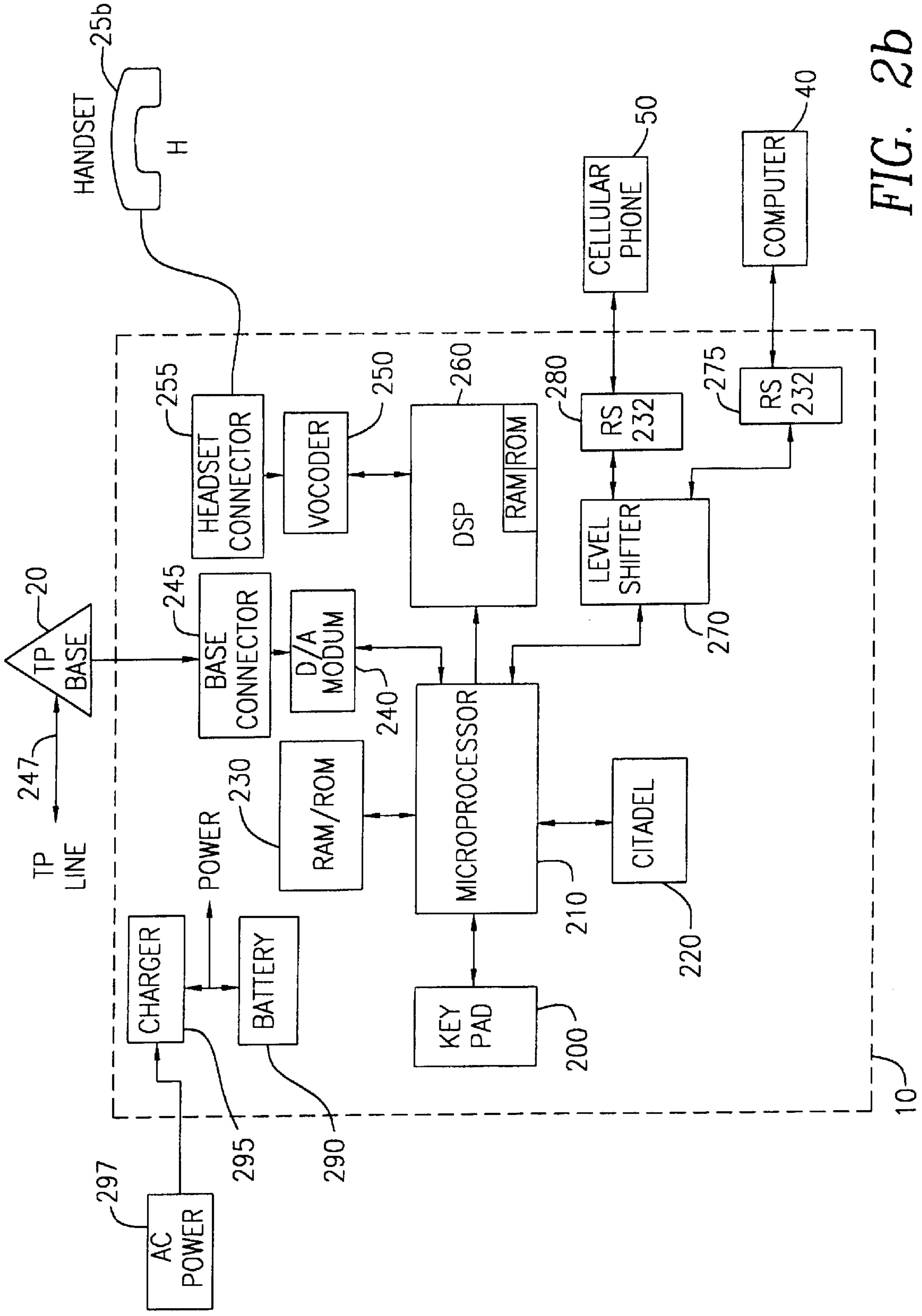
FIG. 2*b* illustrates a block diagram of a telecommunications security device according to a second embodiment of the present invention.

FIG. 2*b* illustrates a block diagram of a second embodiment of security device 10 for providing for encrypted transmission from a plurality of ports for both voice and/or digital data. In this illustrative embodiment, base connector 245 and hand set connector **255*b* are further included in device 10 to permit encryption/decryption of voice data from a standard analog or digital telephone. In this case, base port 245 provides a connection between security device 10 and telephone base 20. Telephone base 20, which in turn provides a connection to network 60 via telephone line 247, as is well known in the art. Furthermore, handset connector 255*b* is representative of a conventional RJ-8 telephone connector as previously discussed. In this case, handset 25*b*, which is conventionally attached to telephone base 20, is detached from its conventional connection to telephone base 20 and connected to security device 10 at port 255*b*. Thus, in this second embodiment, voice data entered at handset 255*b* is applied to vocoder 250 and DSP 260, as previously discussed, rather than immediately applied to telephone base 20**.

Microcontroller 210 may direct digitalized voice data to serial port 280 or base connector port 245 based on the presence of a communication device at one or the other port. For example, when microcontroller 210 detects the presence of a wireless communication device at port 280, then digitized voice data is directed to port 280. However, if microprocessor 210 does not detect the presence of a wireless communication device at port 280, then digitized voice data is directed to port 245. In a preferred embodiment, the presence of a communication device on port 280 assumes priority over the concurrent presence of a communication device on port 245.

When digitized voice data is directed to port 245, internal modem 240 is used to provide appropriate transformation of the digitized data to analog format suitable for the wired network 60. Modem 240 may operate at transmission baud rates ranging from 2400 bits per second to 56K bits per second. It would be further understood other modems, designed for specific networks, may be incorporated in place of the preferred 56K modem, to provide improvement to overall system performance and data transfer rates. Preferably, modem 240 is operated at a rate of 4800 bits per second to accommodate standard telephone systems that have limited bandwidth or are noisy.

In still another aspect of the invention, also illustrated in FIG. 2*b,* second data port 275 is included in security device 10 to allow for the secure transmission of computer data over network 60. Although second data I/O port 275 is illustrated as an RS-232 port, it would be appreciated that port 275 may be selected from a number of well-known serial and parallel interfaces, for example, Universal Serial Bus (USB), Small Computer Serial Iinterface (SCSI), PCMCIA, infrared, BLUETOOTH, FIREWIRE, and similar suitable conventional communication devices.

In this illustrated embodiment, data from computer 40 is applied to device 10 and is then directed either to port 280 or port 245 dependent upon the presence of a corresponding communication device at the respective port, as previously discussed.

Figure 3:
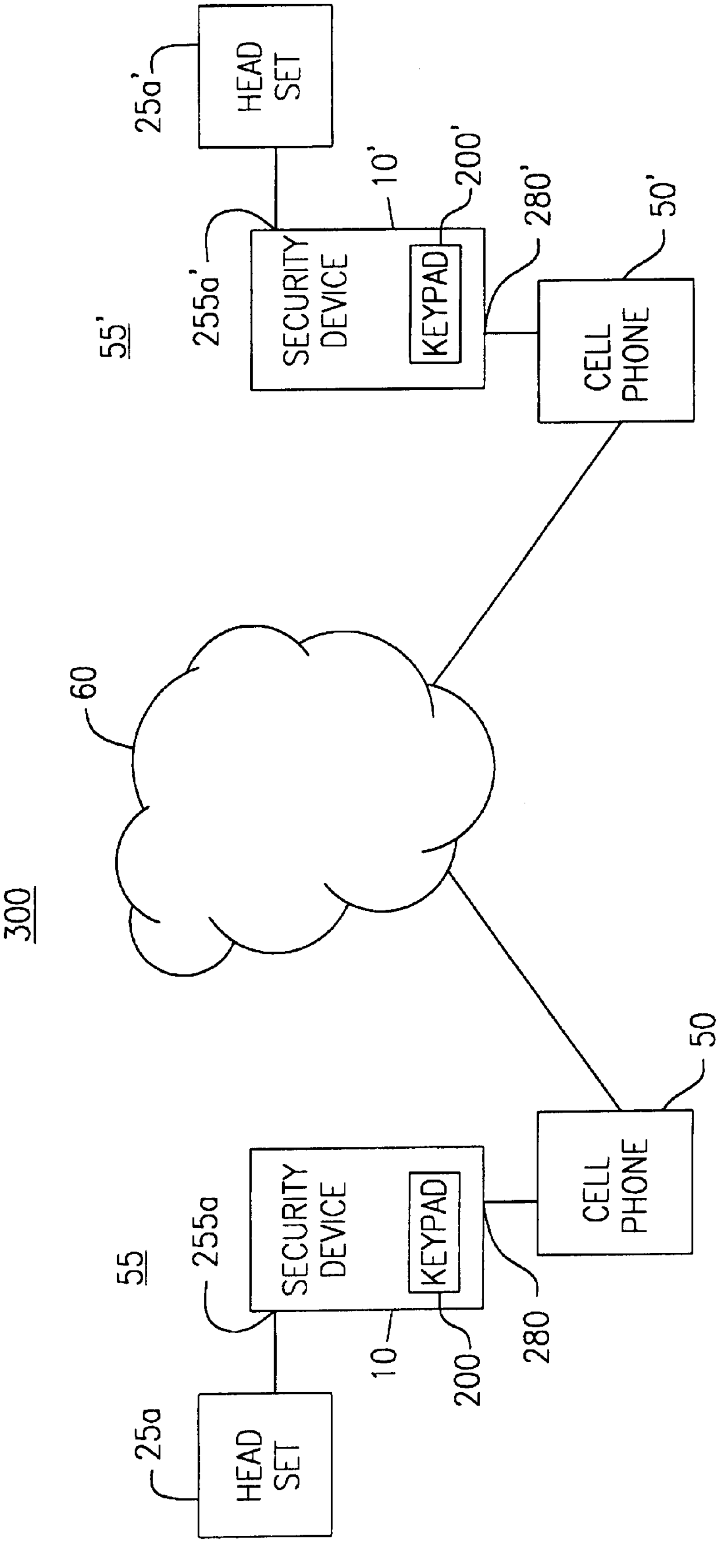
FIG. 3 illustrates a block diagram of a first aspect of the invention.

FIG. 3 illustrates a block diagram of one aspect of the use of security devices 10, 10' for communicating encrypted voice transmission over a wireless network. In this illustrated aspect, cellular telephone 50 is connected via serial port 280 to security device 10 and cellular telephone 50' is connected via serial port 280' to security device 10'. Similarly, headset 25 is connected to security device 10 via port **255*a* and headset 25' is connected to security device 10' via port 255*a*'. Although headsets 25, 25' are illustrated, it would be appreciated that telephone handsets may be interchangeably connected to corresponding security devices 10,10' via ports 255*b*, 255*b'* respectfully. Use of headset 25 merely contributes to the portability of security device 10 and is not intended to be the only means of providing voice data to security device 10** when using a portable transmission/receiving device, such as cellular telephones.

A user at site 55, for example, may input the destination address, i.e., telephone number, of cellular telephone 50' using keypad 200 on security device 10. Microprocessor 210, in response to the inputted telephone number, and in accordance with the configuration setup process, as will be explained, proceeds to transfer the input telephone number via port 280 to cell phone 50. Cell phone 50, in response to its own processing with regard to serial data transfers, receives the transferred telephone number and autonomously dials the provided telephone number. Procedures for dialing and transferring data via wireless communication networks are well known and need not be discussed in detail herein. As would be appreciated, the procedures and protocols for transferring data over the wireless network depend on the specific network characteristics. For example, wireless cellular networks may have characteristics that conform to one or more cellular protocols such as TDMA, CDMA, GSM or protocols used in satellite transmission, which are well known.

After a communication channel is established between users at sites 55 and 55', microcontroller 210, in conjunction with encryption/decryption device 220 transmits information to the user at site 55' that is used by microcontroller 210' at site 55' to encode information that can be decoded by site 55. For example, using public key/private key encryption technology, e.g., Diffe-Hillman public/private key algorithm, site 55 and site 55' each transmit associated public key information. A transmitting site, using the provided public key is enabled to encrypt a message that the receiving is enabled to decrypt messages using an associated private key.

After suitable keys are exchanged, a user at site 55 may then communicate in a secure manner with a user at site 55' by speaking into headset 25. The voice data input by the user at site 55 using headset **25*a* is then digitized, encrypted and transmitted over wireless network 60 using the transmitter contained in cell phone 50** as previously discussed.

Figure 4:
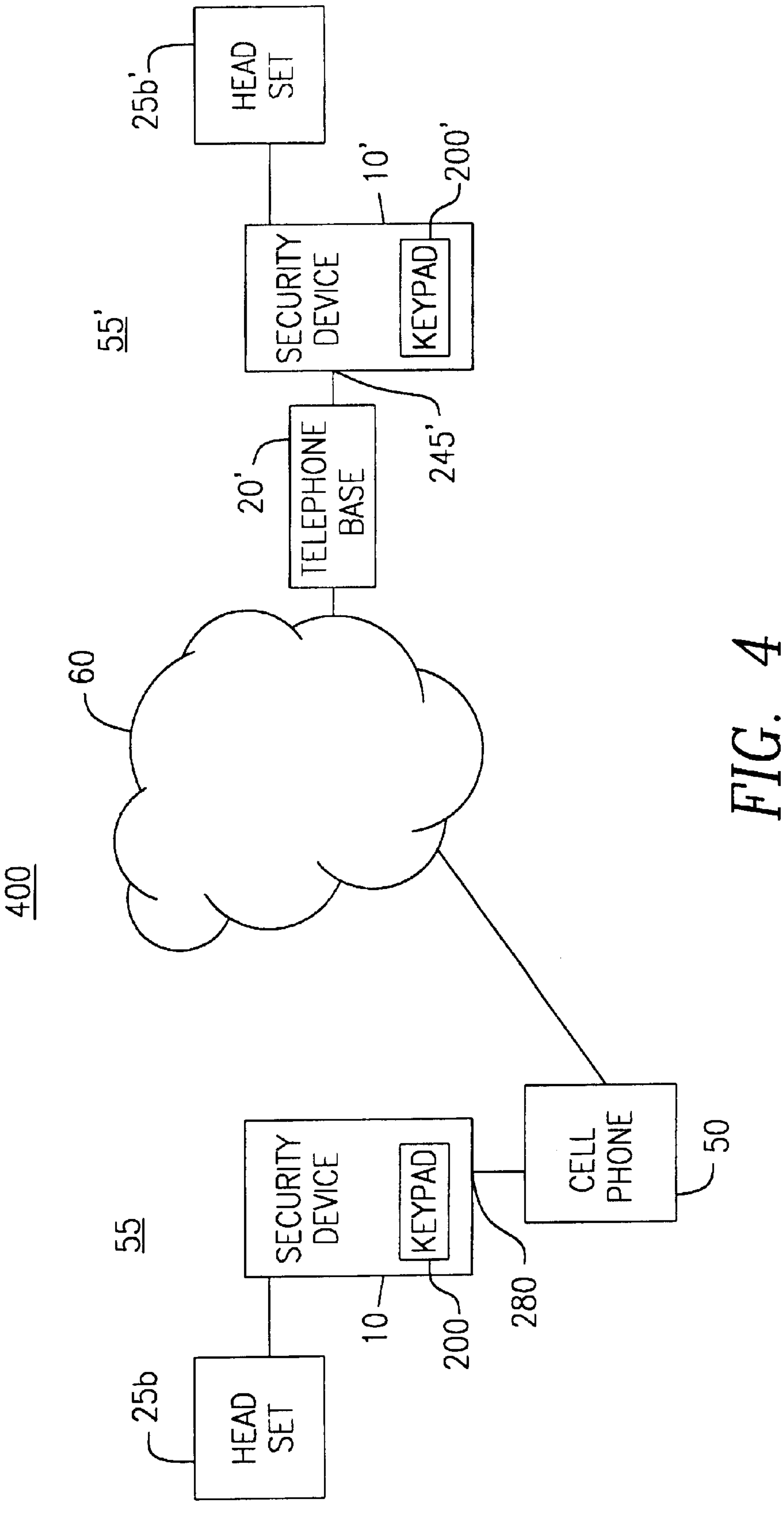
FIG. 4 illustrates a block diagram of a second aspect of the invention.

FIG. 4 illustrates a diagram of a second aspect of the use of security devices 10, 10' for communicating encrypted voice data over a combined wired and wireless network 60. In this illustrated aspect, a wired communication is used by connecting a conventional wire-based telephone 20' to security device 10' at port 245' at user site 55'. Handset **25*b*' is connected to security device 10' at port 255*b*'. With regard to user site 55, cellular telephone 50 and headset 25*a* are connected to security device 10** as previously discussed.

A user at site 55', for example, may input a request to a conventional telephone connect by lifting handset **25*b*' from a cradle (not shown) on land-based telephone 20' in a conventional manner. A telephone number corresponding to the wireless telephone phone 50 at second site 55' may then be entered using keypad 200' on security device 10'. Microprocessor 210 in response to the inputted telephone number and in accordance with the configuration setup process, as will be explained, proceeds to transfer the input telephone number via port 245' to wired-based phone base 20' through modem 240**'. Procedures for dialing and providing a communication channel or link between two devices via wired communication network are well known.

After a communication channel is established with user site 55, in this case, through cell phone 50, microcontroller 210 in conjunction with encryption/decryption device 220 transmits information necessary to decrypt encoded data at the receiving site 55.

After suitable keys are exchanged, for example, public keys in a public/private key system, a user at site 55' may then communicate in a secure manner with a user at site 55 by speaking into handset 25*b*'. The voice data input by the user at site 55' using handset 25*b*' is then digitized, encrypted, and transmitted through land-based telephone 20', which is representative of a network communication device, over network 60.

Figure 5A:
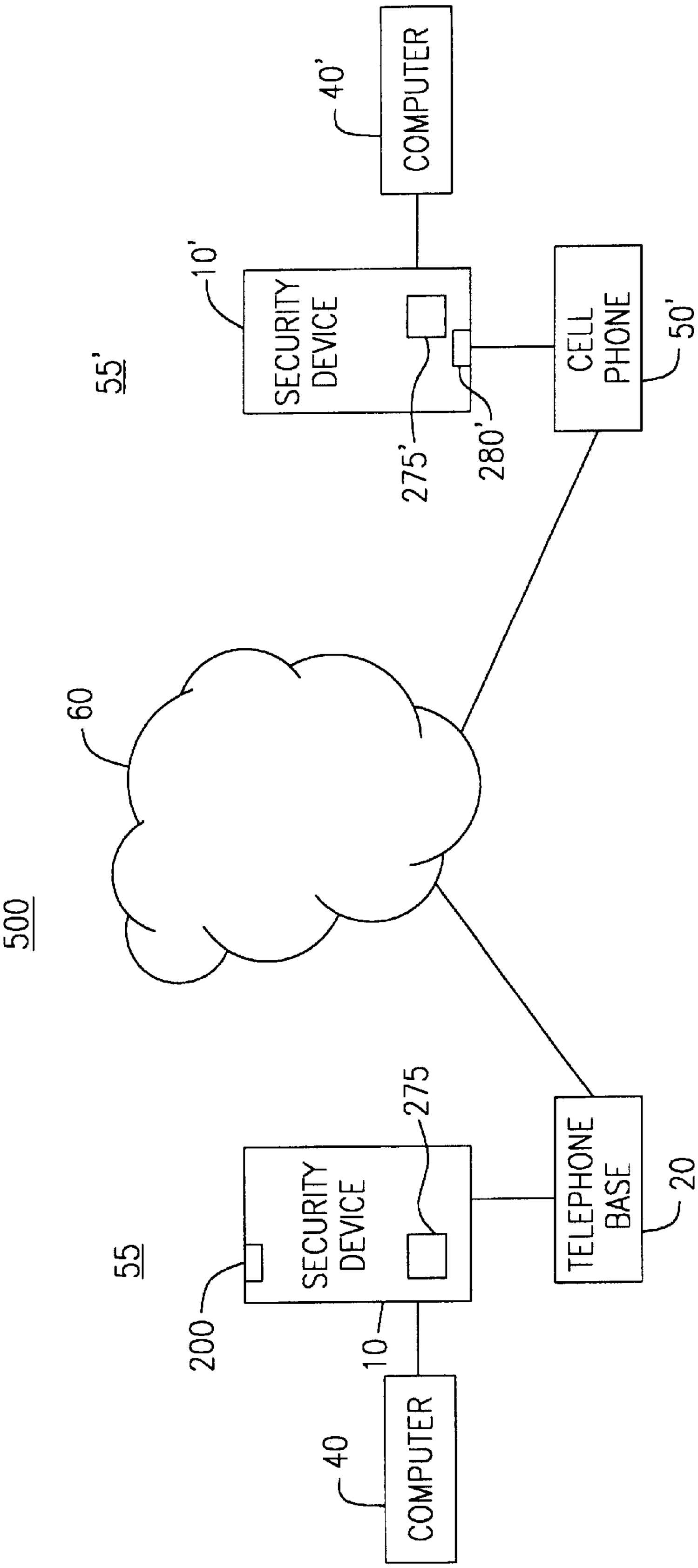
FIG. 5*a* illustrates a block diagram of another aspect of the invention.

FIG. 5*a* illustrates a block diagram 500 of another aspect of using security devices 10, 10' for providing secure computer-to-computer communications over network 60. In this illustrated aspect, computer 40 is connected via serial port 275 to security device 10 and computer 40' is connected via serial port 275' to security device 10'. Further wired-based telephone base 20 is connected to security device 10 and wireless cellular phone 50' is connected to security device 10' via port 280', as previously described.

As previously discussed, a user at first site 55, for example, may input a telephone number of wireless telephone 20' using keypad 200 on security device 10. Microprocessor 210 in response to the inputted telephone number and in accordance with the configuration setup process proceeds to transfer the input telephone number via port 245 to wired base telephone 20. Wired base telephone in response to its own processing receives the transferred telephone number and autonomously dials the input telephone number.

After appropriate key exchange, microcontroller 210 may accept digital data from computer 40 and transmit it securely over network 60 through telephone base 20. Upon receiving the encrypted data, microcontroller 210' may decrypt the received encrypted data and provide the decrypted data to computer 40'.

Figure 5B:
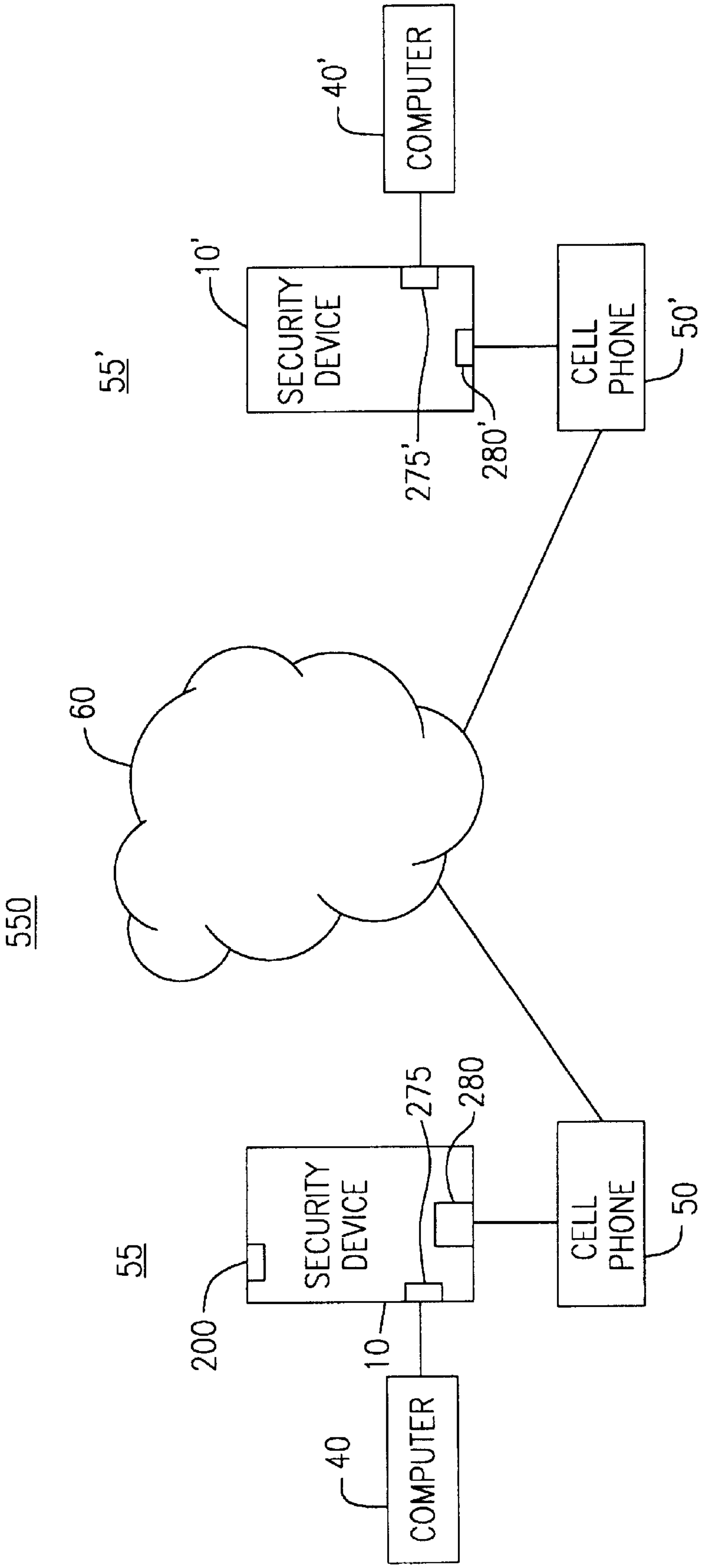
FIG. 5*b* illustrates a block diagram of still another aspect of the invention.

FIG. 5*b* illustrates a block diagram 550 of another aspect of using security devices 10, 10' for providing secure computer-to-computer communications over network 60. In this illustrated aspect, computer 40 is connected via serial port 275 to security device 10 and computer 40' is connected via serial port 275' to security device 10'. Further wireless communication device 50, e.g., a cellular phone, is connected to security device 10 and wireless cellular phone 50' is connected to security device 10' via port 280', as previously described.

A user at first site 55, for example, may input a telephone number of wireless device 50' using keypad 200 on security device 10. Microprocessor 210 in response to the inputted telephone number and in accordance with the configuration setup process proceeds to transfer the input telephone number via port 280 to wireless telephone 50. Wireless telephone 50 in response to its own processing receives the transferred telephone number and autonomously dials the input telephone number.

After appropriate key exchange, microcontroller 210 may accept digital data from computer 40 and transmit it securely over network 60 through wireless telephone 50. Upon receiving the encrypted data, microcontroller 210' may decrypt the received encrypted data and provide the decrypted data to computer 40'.

Although, the operation of the exchanging keys is discussed as being automatically performed upon establishment of a communication channel or link, it will be appreciated that the exchange of keys may be also performed upon microcontroller 210, for example, receiving an indication provided by the user. Security devices 10, 10' may include a button (not shown), for example, which when depressed would indicate to the appropriate device that keys may be exchanged and further communications require encryption. Furtherstill, security devices 10, 10' may contain an indicator, such as a lamp, light or LED, which indicates that key exchange is occurring and/or secure communications is available. For example, a green LED may indicate secure communications is available, while a blinking RED LED may indicate key exchange is occurring and a RED LED may indicate secure communications is not available. In a preferred embodiment, a RED LED indicates secure communication is available, a blinking RED LED indicates key exchange is occurring and a GREEN LED indicates secure communication is not available.

Figure 6:
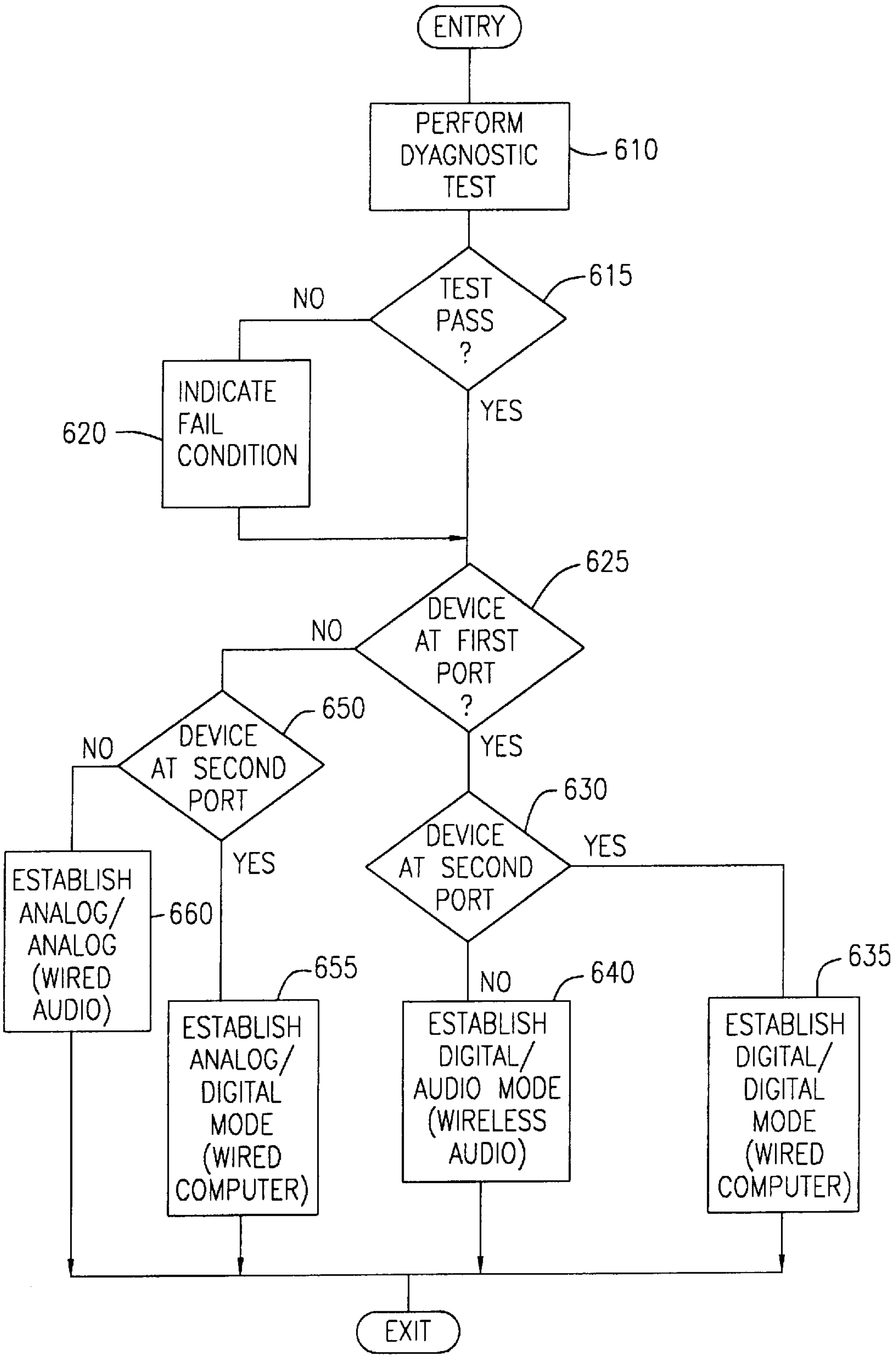
FIG. 6 illustrates a flow chart of a process for determining operational modes in accordance with the principles of the invention.

FIG. 6 illustrates a flow chart of an exemplary configuration setup process 600 of security device 10 is accordance with the principles of the present invention. Upon entry, a preliminary test of the electronic components is executed at block 610. In one aspect, a test of encryption/decryption chip 220 is executed to insure proper operation of the encryption/decryption capability. At block 615 a determination is made whether the encryption/decryption process is available. If the answer is in the negative, then an error indication is provided at block 620.

If, however, the answer is in the affirmative, then a determination is made, at block 625, whether a device is attached to a first serial port. If the answer is in the affirmative, i.e., wireless communication, then a determination made at block 630, whether a device is attached to a second serial port. If the answer is in the affirmative, then a computer wireless configuration is established at block 635.

If however, the answer at block 630 is in the negative, then an audio wireless configuration is established at block 640.

Returning to the determination at block 625, if the answer is negative, i.e., wired communication, then a determination is made, at block 650, whether a device is attached to a second serial port. If the answer is in the affirmative, then a computer wired configuration is established at block 655.

If however, the answer at block 650 is in the negative, an audio wired configuration is established at block 660.

Although the invention has been described in a preferred form with a certain degree of particularity, it is understood that the present disclosure of the preferred form has been made only by way of example, and that numerous changes in the details of construction and combination and arrangement of parts may be made without departing from the spirit and scope of the invention as hereinafter claimed. It is intended that the patent shall cover by suitable expression in the appended claims, whatever features of patentable novelty exist in the invention disclosed.

We claim:

1. A device for providing secure communications over a network comprising:

at least one communication port for transfer of audio data;

at least one communication port for transfer of digital data;

a keypad;

an encoding/decoding device;

a conversion device operable to convert between audio and digital data;

a processor, in communication with a memory, said keypad and said encoding/decoding device, operable to execute code for:

selecting a configuration of a transmission and a reception port from among said communication ports dependent upon the presence of a network communication device and an input/output device in communication with said selected ports;

providing data received from said selected reception port to said encryption/decryption device for encrypting; and providing said encrypted data to said selected transmission port.

2. The device as recited in claim 1 wherein said processor is further operable to execute code for:

receiving data from said selected transmission port;

providing said received data to said encoding/decoding device for decrypting; and providing said decrypted data for subsequent presentation at said reception port.

3. The device as recited in claim 1 wherein said processor is further operable to execute code for:

accepting information items associated with a destination address from said keypad; and providing said information items to said transmission port.

4. The device as recited in claim 1 further comprising:

at least one indicator for indicating the availability of secure communications.

5. The device as recited in claim 1 further comprising:

a means for initiating secure communications.

6. The device as recited in claim 5, wherein said means is a button.

7. The device as recited in claim 5, wherein said means is one of said indicators.

8. The device as recited in claim 5 wherein said processor is further operable to execute code for:

responding to said means for initiating secure communications; and providing selected encryption information items to said transmission port.

9. The device as recited in claim 1, wherein said processor is further operable to execute code for:

providing selected encryption information items to said selected transmission port.

10. The device as recited in claim 1 wherein at least one of said selected ports is a digital port.

11. The device as recited in claim 10 wherein said at least one of said selected digital port is an RS-232 port.

12. The device as recited in claim 11 further comprising:

a level shifter between said RS-232 port and said processor.

13. The device as recited in claim 1 wherein said selected transmission port is an audio port.

14. The device as recited in claim 13 further comprising:

a modem in communication with said transmission port and said processor.

15. The device as recited in claim 1 wherein said ports for transferring audio data are selected from the group comprising: mini-RCA 2.5 mm stereo jack , RJ-8, RJ-11.

16. The device as recited in claim 1 wherein said ports for transferring digital data are selected from the group comprising: RS-232, infraRed, Bluetooth, PCMCIA, USB, SCSI.

17. The device as recited in claim 1 wherein said code is contained in said memory.

18. The device as recited in claim 1 wherein said processor is selected from the group comprising, microcontroller, microprocesser, digital signal processor, ACSIS, PAL, FPGA.

19. The device as recited in claim 1 wherein data received from said selected reception port is applied to said conversion device when said selected reception port is one of said audio communication ports.

20. The device as recited in claim 2 wherein said decrypted data is provided to said conversion device when said reception port is selected from said at least one audio communication ports.

21. The device as recited in claim 1 further comprising:

a power source.

22. The device as recited in claim 21 wherein said power source is a battery.

23. The device as recited in claim 22 wherein said battery is rechargeable.

24. The device as recited in claim 1 wherein said input/output device is selected from the group comprising: a headset, a handset.

25. The device as recited in claim 1 wherein said network connection device is selected from the group comprising: a land-based telephone, a cellular telephone, a satellite telephone, a personal directory assistant, a pager.

26. The device as recited in claim 1 wherein said conversion device comprises:

a processor operable to convert audio data to digital format using known algorithms.

27. The device as recited in claim 26 wherein said processor is further operable to convert digital audio to analog format using known algorithms.

28. A device for providing secure communications over a network comprising:

a communication port for transfer of audio data;

a communication port for transfer of digital data;

a keypad;

an encoding/decoding device;

a conversion device operable to convert between audio and digital data;

a processor, in communication with a memory, said keypad and said encoding/decoding device, operable to execute code for:

selecting a configuration of a transmission and a reception port from among said communication ports dependent upon the presence of a network communication device and an input/output device in communication with said selected ports;

providing data received from said selected reception port to said encryption/decryption device for encrypting; and providing said encrypted data to said selected transmission port.

29. A device for providing secure communications over a network comprising:

a communication port for transfer of audio data;

a plurality of communication ports for transfer of digital data;

a keypad;

an encoding/decoding device;

a conversion device operable to convert between audio and digital data;

a processor, in communication with a memory, said keypad and said encoding/decoding device, operable to execute code for:

selecting a configuration of a transmission and a reception port from among said communication ports dependent upon the presence of a network communication device and an input/output device in communication with said selected ports;

providing data received from said selected reception port to said encryption/decryption device for encrypting; and providing said encrypted data to said selected transmission port.

* * * * *